United States Patent [19]

Ichijo et al.

[11] Patent Number: 4,737,415
[45] Date of Patent: Apr. 12, 1988

[54] MAGNETIC RECORDING MEDIUM AND PRODUCTION THEREOF

[75] Inventors: Minoru Ichijo, Ibaraki; Tsunemi Ohiwa, Osaka; Fumio Kokai, Ibaraki; Takashi Kubota, Ibaraki; Kunio Wakai, Ibaraki, all of Japan

[73] Assignee: Hitachi Maxell, Ltd., Osaka, Japan

[21] Appl. No.: 800,144

[22] Filed: Nov. 20, 1985

[30] Foreign Application Priority Data

Nov. 20, 1984 [JP] Japan .................................. 59-243168
May 31, 1985 [JP] Japan .................................. 60-119372

[51] Int. Cl.4 .............................. G11B 5/72; G11B 5/71
[52] U.S. Cl. ............................. 428/447; 427/128; 427/131; 427/132; 427/41; 428/694; 428/695; 428/900
[58] Field of Search ............... 427/41, 128, 131, 132; 428/694, 695, 900, 457, 447

[56] References Cited

U.S. PATENT DOCUMENTS 4,419,404 12/1983 Arai .................................. 427/131
4,548,864 10/1985 Nakayama ........................ 428/900
4,565,734 1/1986 Arai ................................... 428/422
4,582,746 4/1986 Shirohata .......................... 427/132
4,599,266 7/1986 Nakayama ........................ 428/336
4,601,950 7/1986 Iida ................................... 428/900

Primary Examiner—Ellis P. Robinson
Attorney, Agent, or Firm—Birch, Stewart, Kolasch & Birch

[57] ABSTRACT

A magnetic recording medium comprising a substrate, a magnetic layer and a protective layer which consists of an organic polymeric material comprising carbon atoms, hydrogen atoms and oxygen atoms, the content of the oxygen atoms increasing towards the outer surface of the protective layer, which has improved durability and corrosion resistance.

12 Claims, 2 Drawing Sheets

MAGNETIC RECORDING MEDIUM AND PRODUCTION THEREOF

BACKGROUND OF THE INVENTION

1. Field of the Invention

The present invention relates to a magnetic recording medium and production thereof. More particularly, it relates to a magnetic recording medium with improved durability and corrosion resistance and a method for the production thereof.

2. Description of Related Art

One method for producing a magnetic recording medium comprises applying a layer of a magnetic metal or metal alloy by vacuum deposition or sputtering on a substrate film, or bonding a ferromagnetic metal powder together with a binder component on the substrate film. Since the magnetic recording medium is vigorously slid against a magnetic head during recording or reproducing information, the magnetic layer tends to be abraded. Particularly, while the magnetic recording medium with the magnetic layer formed by vacuum deposition is suitable for high density recording, its friction coefficient with the magnetic head is so large that it is easily abraded or scratched. In addition, the deposited metal layer is gradually oxidized in the air, which results in a deterioration of the magnetic characteristics, such as the maximum magnetic flux density.

In order to improve the durability and corrosion resistance of the magnetic recording medium, it has been proposed to provide a protective layer on the surface of the magnetic layer. For example, Japanese Patent Kokai Publications (unexamined) Nos. 8882/1983 and 60427/1983 disclose a protective layer produced by plasma polymerization of a fluorine-containing organic compound or a silicon-containing organic compound, and Japanese Patent Kokai Publication No. 154643/1984 discloses the formation of a lubricant layer made of an organic compound having a carbon-carbon unsaturated bond on the protective layer produced by plasma polymerization.

The magnetic recording medium having either or both the protective and/or lubricating layers, however, does not have satisfactory durability and corrosion resistance, so that it is quickly abraded by sliding on the magnetic head.

SUMMARY OF THE INVENTION

Therefore, one object of the present invention is to provide a magnetic recording medium with improved durability and corrosion resistance.

Another object of the present invention is to provide a method for producing a magnetic recording medium with improved durability and corrosion resistance.

Accordingly, the present invention provides a magnetic recording medium comprising a substrate, a magnetic layer and a protective layer which consists of an organic polymeric material comprising carbon atoms, hydrogen atoms and oxygen atoms, such that the content of the oxygen atoms increases towards the outer surface of the protective layer. The organic polymeric material may further comprise silicon atoms and/or metal atoms.

Further, the present invention provides a method for producing a magnetic recording medium comprising a substrate, a magnetic layer and a protective layer which consists of an organic polymeric material comprising carbon atoms, hydrogen atoms and oxygen atoms, the method comprising forming the magnetic layer on the substrate, providing a protective layer which consists of an organic polymeric material comprising carbon atoms and hydrogen atoms, and then plasma treating the protective layer in an oxygen-containing atmosphere to add oxygen atoms to the protective layer so that the content of the oxygen atoms increases towards the outer surface of the protective layer. By the plasma treatment, a degree of cross-linking increases and the organic polymer becomes harder particularly near the surface of the protective layer.

According to the present invention, a lubricating layer is preferably formed on the plasma treated protective layer.

DETAILED DESCRIPTION OF THE INVENTION

Figure 1:
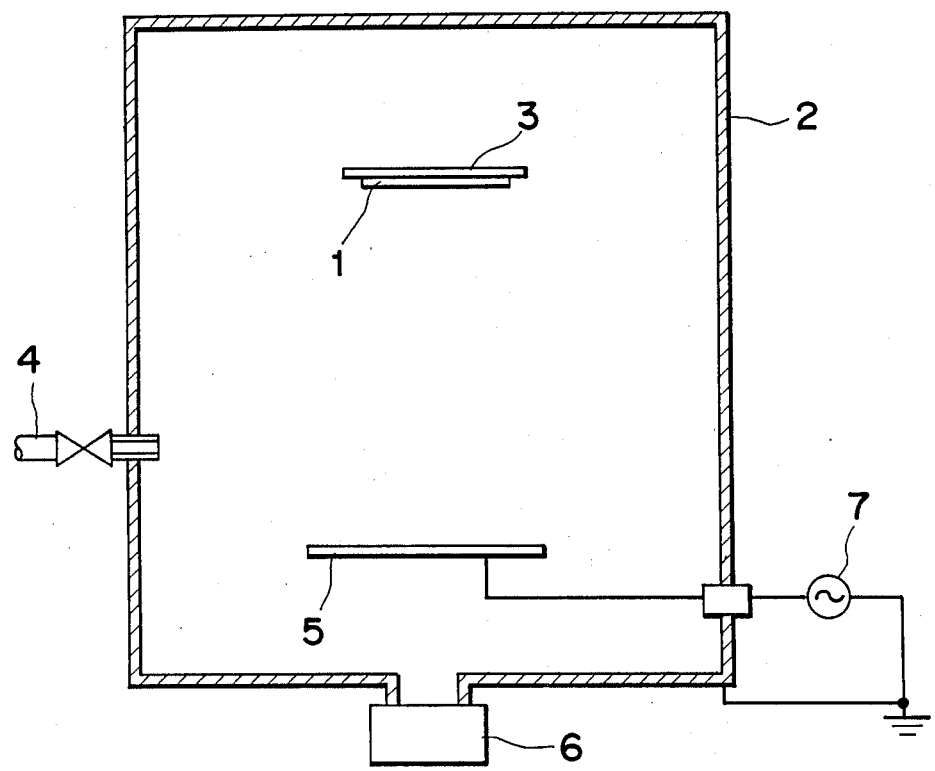
FIG. 1 schematically shows a cross section of equipment used for plasma polymerization and treatment of a protective layer according to the present invention.

In the present invention, when the protective layer is formed by the plasma polymerization on the magnetic layer of the magnetic recording medium, at least one monomer is plasma polymerized in a treating vessel by applying radio frequency or microwave to deposit a corresponding polymer on the magnetic layer. Specific examples of the plasma polymerizable monomer are hydrocarbons (e.g. methane, propane, ethylene, propylene, and the like), silicon-containing compounds (e.g. tetramethylsilane, hexamethyldisilane, hexamethyldisilazane, hexamethylsiloxane, octamethylcyclotetrasiloxane and the like) and organometallic compounds (e.g. tetramethyltin, tetramethylgermanium, ferrocene, pentaethoxytantalum, titanium tetraisopropoxide and the like). When such a monomer is subjected to radio frequency or microwave, a corresponding radical is formed and polymerization proceeds so as to deposit the polymer on the magnetic layer. A monomer may be used alone or as a mixture of two or more monomers. When the monomer is diluted with a carrier gas such as argon, helium and/or oxygen, the polymer is deposited two or three times faster than without the carrier gas. When the monomer is diluted with the carrier gas, the ratio of the former to the latter is, preferably, from 1:1 to 1:20. When the carrier gas is used in a very small amount, the polymerization rate is not improved very much. When the carrier gas is used in very large amount, the monomer compound is excessively diluted so that the polymerization reaction may be adversely affected.

Oxygen is preferably used as the carrier gas, since the formed protective layer can contain oxygen atom throughout its thickness, and the degree of cross-linking is increased. Further, the adhesivity with a second protective layer formed thereon is improved. However, when the silicon-containing monomer, such as octamethylcyclotetrasiloxane, is plasma polymerized in the presence of a comparatively large amount of oxygen, a powdery polymer is produced. Therefore, when the silicon-containing monomer is used, the oxygen should be used in an amount of 10 to 30% by volume of the volume of the used monomer. Preferably, in the produced silicon-containing polymer, atomic ratios of oxygen atom and carbon atom to silicon atom are from 0.7:1 to 1.3:1 and from 1.5:1 to 3.5:1, respectively, or atomic ratios of oxygen atom, nitrogen atom and carbon atom to silicon atom are from 0.7:1 to 1.3:1, from 0.3:1 to 0.7:1 and from 1.5:1 to 3.5:1, respectively.

In the plasma polymerization, preferably, the gas pressure is from 0.001 to 5 Torr and the power of the radio frequency is from 0.03 to 5 W/cm$^2$. More preferably, the gas pressure is from 0.003 to 1 Torr and the power of the radio frequency is from 0.05 to 3 W/cm$^2$. As the gas pressure is increased, the polymerization rate increases while the polymer produced has a low degree of cross-linking so that a hard protective layer is not deposited. To the contrary, when the gas pressure is decreased with while increasing the power of the radio frequency, the polymerization rate decreases while the produced polymer has a high degree of cross-linking so that a hard polymer is deposited. But, if the gas pressure is too low and the power of the radio frequency is too large, a powdery polymer is produced so that a protective layer is not formed. The protective layer formed by plasma polymerization of the organic monomer under the above described conditions is dense and has a small friction coefficient so that the abrasion resistance of the protective layer is improved.

The thickness of the protective layer is usually from 20 to 2,000 Å, preferably from 20 to 1,000 Å. When the layer is too thin, the durability of the protective layer is not satisfactorily improved. When it is too thick, spacing loss becomes so large that the recording/reproducing characteristics are adversely affected.

When the protective layer is formed on the magnetic layer by sputtering, a resin with good heat resistance is deposited on the magnetic layer by sputtering in an inert gas such as argon. In order that the protective layer contain oxygen atoms, there may be used a resin which has oxygen atoms in its molecular structure, or oxygen is added to the inert gas. The presence of oxygen atoms in the resin increases the degree of cross-linking of the protective layer and improves the adhesivity with a second protective layer. The resin to be used should have good heat resistance so that it does not soften or decompose at a temperature not higher than 200° C. Specific examples of the heat resistant resin are imido resins, silicone resins, phenol resins, melamine resins, formalin resins, urea resins, furan resins, epoxy resins and the like.

Pressure of the inert gas and power of radio frequency during sputtering are 0.001 to 0.1 Torr and 0.1 to 2 W/cm$^2$, respectively so as to control the deposition rate.

The protective layer formed by sputtering of the heat resistant resin is dense and has a small friction coefficient so that the protective layer has good abrasion resistance and corrosion resistance.

The thickness of the protective layer is from 20 to 2,000 Å, preferably from 20 to 1,000 Å. When it is too thin, the durability and corrosion resistance are not satisfactorily improved. When it is too thick, the spacing loss becomes so large that the recording/reproducing characteristics are adversely affected.

According to the present invention, the magnetic recording medium with the thus formed protective layer is then plasma treated, for example, with oxygen plasma generated by radio frequency in a treating vessel. Since the oxygen plasma involves high energy, the surface of the protective layer is well oxidized and the degree of cross-linking of the protective layer, particularly near its surface is increased so that the protective layer becomes more dense and harder and has a low friction coefficient.

In addition, the surface of the plasma treated protective layer is more hydrophilic and has improved adhesivity. Therefore, when the second protective layer, for example, a lubricant layer is formed on it, polar groups of the lubricant sufficiently bond to the surface so that the second protective layer is securely adhered to the first protective layer. Furthermore, the molecules of the lubricant are oriented so that the lubricity and abrasion resistance of the surface are sufficiently improved.

Preferably, the distribution of oxygen atom in the plasma treated protective layer is such that the oxygen content in 20 Å thickness from the surface of the protective layer is 5 to 70% by weight of the organic polymer in said thickness, and the oxygen content in the whole protective layer is 5 to 50% by weight of the organic polymer. When the organic polymer consists of carbon atoms, hydrogen atoms, oxygen atoms and optionally metal atoms, the content of carbon atoms and hydrogen atoms is preferably from 10 to 50% by weight and from 5 to 30% by weight, respectively. When the organic polymer consists of silicon atoms, carbon atoms, hydrogen atoms, oxygen atoms and optionally metal atoms, an atomic ratio of carbon atom to silicon atom is from 0.5:1 to 2.5:1 and an atomic ratio of hydrogen atom to silicon atom is less than 5:1.

The plasma treatment of the protective layer, according to the present invention, is preferably carried out under such conditions that the pressure of oxygen gas is from 0.03 to 1 Torr, more preferably from 0.003 to 0.5 Torr, and the power of the radio frequency is from 0.03 to 5 W/cm$^2$, more preferably from 0.05 to 3 W/cm$^2$.

According to the present invention, the second protective layer is optionally formed on the first plasma treated protective layer so as to further improve the abrasion and corrosion resistance of the magnetic recording medium. The second protective layer may be a lubricant layer, a resin layer or a polymer layer produced by plasma polymerization.

The lubricant to be used according to the present invention includes aliphatic lubricants, fluorine-containing lubricants, silicon-containing lubricants and hydrocarbon base lubricants. Specific examples of the aliphatic lubricants are aliphatic acids (e.g. lauric acid, myristic acid, palmitic acid, stearic acid and behenic acid), metal salts of aliphatic acids (e.g. zinc stearate and cobalt stearate), esters of aliphatic acids (e.g. n-butyl stearate and octyl myristate), aliphatic alcohols (e.g. stearyl alcohol and myristyl alcohol), aliphatic acid chlorides (e.g. trimethylstearyl ammonium chloride and stearoyl chloride) and amines (e.g. stearyl amine, stearyl amine acetate and stearyl amine hydrochloride). Specific examples of the fluorine-containing lubricants are perfluoropolyesters and perfluoroalkyl polyethers. Commercially available fluorine-containing lubricants include those sold under trade names of "Daiflon #20"

(manufactured by Daikin Industries Ltd.), "Krytox M", "Krytox H", "Bydax AR" (all manufactured by du Pont), and "Fomblin Z" (manufactured by Montedison). Specific examples of the silicon-containing lubricants are silicone oils and modified silicone oils. Specific examples of the hydrocarbon base lubricants are preferably, squalane and waxes. Among them, those having a polar group such as —COOH, —OH, —NH$_2$, —CONH$_2$ and the like are preferred since the polar group improves the adhesivity with the first protective layer and particularly reduces the friction coefficient.

For forming the lubricant layer, at least one lubricant is dissolved in a suitable solvent and the resulting solution is applied on the surface of the first protective layer by, for example, dipping, gravure-roll coating or spray coating. The suitable solvent includes methyl isobutyl ketone, methyl ethyl ketone, isopropyl alcohol, benzene, toluene, fluorinated hydrocarbons (e.g. Freon TF (trade name) manufactured by Mitsui Toatsu Chemicals Inc.), cyclohexanone, ethyl acetate, tetrahydrofuran, dimethylformamide, dioxane and the like. Alternatively, the lubricant may be vacuum deposited on the first protective layer.

The thickness of the lubricant layer is preferably from 20 to 200 Å. When the thickness is less than the lower limit, the effect of the lubricant is not satisfactorily exerted. When it is larger than the upper limit, the spacing loss becomes so large that the electric characteristics of the recording medium are adversely affected.

When a ferromagnetic metal layer containing cobalt as an essential component is heated in the presence of oxygen and water vapor before the formation of the protective layer so as to mildly oxidize the surface of the magnetic layer, a layer of amorphous cobalt (III) oxide containing water molecules is formed, this resulting in further improvement of durability.

The magnetic layer may be formed by a conventional method. For example, a mixture of magnetic powder, a binder and an organic solvent is applied on the substrate and dried. Examples of the magnetic powder are γ-Fe$_2$O$_3$ powder, Fe$_3$O$_4$ powder, cobalt-containing γ-Fe$_2$O$_3$ powder, cobalt-containing Fe$_3$O$_4$ powder, Fe powder, Co powder, Fe-Ni powder and the like. Alternatively, a thin layer of ferromagnetic metal is formed on the substrate by vacuum depositing, ion plating, sputtering or plating. Examples of the ferromagnetic metal are Co, Fe, Ni, Co-Ni alloy, Co-Cr alloy, Co-P alloy, Co-Ni-P alloy and the like.

The magnetic recording medium according to the present invention may be a magnetic recording tape the substrate of which is made of a synthetic resin film, such as a polyester resin film or a polyimido resin film; and a magnetic disc or drum the substrate of which is made of aluminum, a glass disc or drum.

PREFERRED EMBODIMENT

The present invention will hereinafter be explained further in detail by the following examples wherein % and parts are by weight unless otherwise indicated.

EXAMPLE 1

By using a conventional vacuum deposition equipment, cobalt was vacuum deposited on a polyester film of 10 μm in thickness under a pressure of $1\times10^{-5}$ Torr to form a ferromagnetic cobalt layer of 1,000 Å.

The polyester film 1 with the ferromagnetic metal layer was set on a plate 3 positioned in the upper part of a treating vessel 2 of a plasma treating equipment shown in FIG. 1. Then, gaseous tetramethylsilane was introduced in the vessel 2 through an inlet 4 at a flow rate of 100 sccm (standard cubic centimeter/minute) and plasma polymerized for 20 seconds under a gas pressure of 0.05 Torr at a 13.56 MHz radio frequency with a power density of 0.5 W/cm$^2$ supplied to an electrode 5 to form a protective layer of 150 Å in thickness.

Thereafter, the gas to be introduced was changed from the monomer to oxygen gas at a rate of 200 sccm and the protective layer was plasma treated for 30 seconds under a gas pressure of 0.06 Torr at a radio frequency with a power density of 0.5 W/cm$^2$ supplied to the electrode 5.

In FIG. 1, numeral 6 represents a vacuum pump system to reduce the inner pressure of the vessel 2 and numeral 7 represents a radio frequency power supply.

The plasma treated film-form medium was dipped in a 0.1% solution of stearic acid in toluene and dried to form a lubricant layer of 50 Å in thickness on the protective layer.

Figure 2:
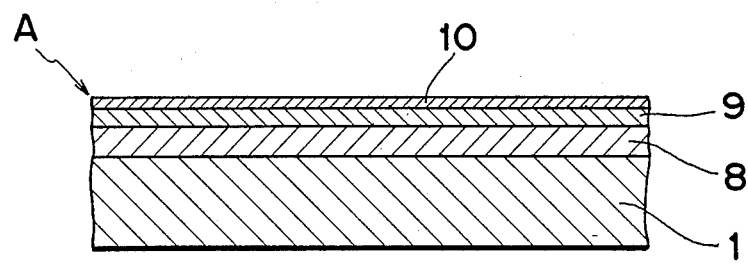
FIG. 2 is an enlarged cross section of one embodiment of the magnetic recording medium of the present invention, FIG. 3 schematically shows a cross section of another alternate equipment used for plasma polymerization and treatment of the protective layer according to the present invention.

The film-form medium was cut to form a magnetic tape A consisting of a substrate film 1, the ferromagnetic metal layer 8, the protective layer 9 and the lubricant layer 10 as shown in FIG. 2.

EXAMPLE 2

In the same manner as in Example 1 but introducing oxygen gas at a rate of 50 sccm together with the monomer and adjusting the gas pressure at 0.07 Torr in the plasma polymerization step, a magnetic recording tape A having a plasma polymerized protective layer of 120 Å in thickness was produced.

EXAMPLE 3

In the same manner as in Example 1 but introducing hexamethyldisilazane at a rate of 100 sccm in place of tetramethylsilane and adjusting the gas pressure at 0.03 Torr in the plasma polymerization step, a magnetic recording tape A having a plasma polymerized protective layer of 200 Å in thickness was produced.

EXAMPLE 4

In the same manner as in Example 1 but introducing methane at a rate of 80 sccm in place of tetramethylsilane and adjusting the gas pressure at 0.07 Torr and the power density at 0.3 W/cm$^2$ in the plasma polymerization step, a magnetic recording tape A having a plasma polymerized protective layer of 180 Å in thickness was produced.

EXAMPLE 5

In the same manner as in Example 1 but introducing tetramethyltin at a rate of 50 sccm in place of tetramethylsilane in the plasma polymerization step, a magnetic recording tape A having a plasma polymerized protective layer of 100 Å in thickness was produced.

EXAMPLE 6

By using the equipment of FIG. 1 modified by providing a capton as a target on the electrode 5, a protective layer was formed by sputtering at the power density of 1 W/cm$^2$ with introducing the same monomer as used in Example 1 with argon at a rate of 200 sccm to keep the gas pressure at $3\times10^{-5}$ Torr. The protective layer was plasma treated and the lubricant layer was formed in the same manner as in Example 1 to produce a magnetic recording tape having a sputtered protective layer of 200 Å.

EXAMPLE 7

In the same manner as in Example 1 but using 0.1% solution of cobalt stearate in toluene in place of the solution of stearic acid in the step of forming the lubricant layer, a magnetic recording tape A having a lubricant layer of 30 Å in thickness was produced.

EXAMPLE 8

In the same manner as in Example 1 but using 0.1% solution of trimethylstearyl ammonium chloride in isopropyl alcohol in place of the solution of stearic acid in the step of forming the lubricant layer, a magnetic recording tape A having a lubricant layer of 40 Å in thickness was produced.

EXAMPLE 9

In the same manner as in Example 1 but using 0.05% solution of Krytox M (trade name) (perfluoroalkyl polyether manufactured by du Pont) in Freon TF in place of the solution of stearic acid in the step of forming the lubricant layer, a magnetic recording tape A having a lubricant layer of 50 Å in thickness was produced.

EXAMPLE 10

In the same manner as in Example 1 but forming a lubricant layer by vacuum depositing stearic acid under reduced pressure of $1\times10^{-5}$ Torr, a magnetic tape having a lubricant layer of 60 Å in thickness was produced.

EXAMPLE 11

The following composition was mixed and dispersed in a ball mill for 72 hours to prepare a magnetic coating paint:

| Composition | Parts |
|---|---|
| α—Fe magnetic powder | 600 |
| S—lec CN*[1] (vinyl chloride/vinyl acetate copolymer) | 80 |
| Pandex T-5250*[2] (urethane elastomer) | 30 |
| Colonate L*[3] (low molecular weight trifunctional isocyanate) | 10 |
| Methyl isobutyl ketone | 400 |
| Toluene | 400 |

Note
*[1]Manufactured by Sekisui Kagaku.
*[2]Manufactured by Dainippon Ink.
*[3]Manufactured by Nippon Urethane.

The magnetic layer was coated on a polyester film of 10 μm in thickness and dried to form a 4 μm thick layer. Then, the protective layer and the lubricant layer were formed in the same manner as in Example 1 to produce a magnetic recording tape.

EXAMPLE 12

In the same manner as in Example 1 except that before the formation of the protective layer, the film having the ferromagnetic cobalt layer was heated for 3 hours in a heating vessel kept at 60° C. and 30% RH under atmosphere pressure, a magnetic recording tape with the protective layer and the lubricant layer was produced.

EXAMPLE 13

In the same manner as in Example 1 but not forming any lubricant layer, a magnetic recording tape was produced.

COMPARATIVE EXAMPLE 1

In the same manner as in Example 1 but not subjecting the protective layer to the plasma treatment, a magnetic recording tape was produced.

COMPARATIVE EXAMPLE 2

In the same manner as in Example 1 but not forming any protective layer, a magnetic recording tape was produced.

COMPARATIVE EXAMPLE 3

In the same manner as in Example 1 but not subjecting the protective layer to the plasma treatment and not forming any lubricant layer, a magnetic recording tape was produced.

The magnetic recording tapes produced in Examples 1-13 and Comparative Examples 1-3 were examined for their friction coefficient, durability and corrosion resistance.

The evaluation of the friction coefficient and the durability was carried out with a stainless steel pin of 4 mm in diameter. The friction coefficient was the value of 100 time slide.

The durability was evaluated by counting the number of sliding against the stainless steel pin till the tape was damaged. The corrosion resistance was evaluated by keeping the tape under conditions of 60° C. and 90% RH for 7 days and measuring decrease of the saturation magnetization (MS) of the tape as compared with that of the original tape.

The results are shown in Table 1.

TABLE 1

| Example No. | Friction Coefficient | Durability (numbers) | Decrease of MS (%) |
|---|---|---|---|
| 1 | 0.19 | 4,500 | 5.5 |
| 2 | 0.19 | 5,000 | 5.3 |
| 3 | 0.21 | 4,250 | 5.4 |
| 4 | 0.18 | 4,400 | 6.0 |
| 5 | 0.20 | 4,300 | 5.0 |
| 6 | 0.18 | 4,620 | 5.5 |
| 7 | 0.19 | 4,600 | 5.2 |
| 8 | 0.20 | 4,500 | 5.7 |
| 9 | 0.22 | 4,320 | 6.0 |
| 10 | 0.20 | 4,430 | 5.3 |
| 11 | 0.19 | 4,850 | 3.0 |
| 12 | 0.19 | 4,650 | 2.0 |
| 13 | 0.23 | 3,800 | 5.5 |
| Comp. 1 | 0.25 | 2,110 | 6.0 |
| Comp. 2 | 0.22 | 3,050 | 13.5 |
| Comp. 3 | 0.30 | 2,530 | 6.3 |

As is seen from the above results, the magnetic recording tapes produced according to the present invention have smaller friction coefficient than those produced in Comparative Examples. The increase of sliding numbers and smaller degree of saturation magnetization of the magnetic recording tapes of the invention mean that they have better durability and corrosion resistance.

EXAMPLE 14

By using a conventional vacuum deposition equipment, cobalt was vacuum deposited on a polyester film of 10 μm in thickness under a pressure of $1 \times 10^{-5}$ Torr to form a ferromagnetic cobalt layer of 1,000 Å.

Figure 3:
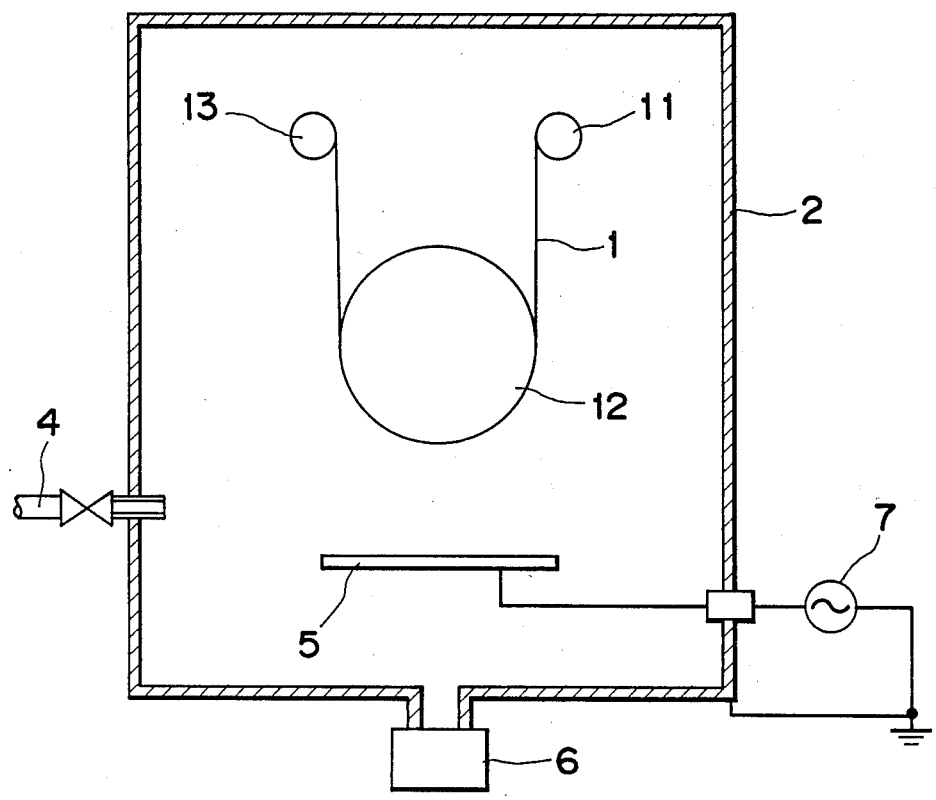

The polyester film 1 with the ferromagnetic metal layer set on an unwinding roll 11 positioned in the upper part of a treating vessel 2 of a plasma treating equipment shown in FIG. 3 and wound by a winding roll 13 at a rate of 1 m/min. with sliding over a peripheral surface of a rotating cylindrical can 12. Then, a monomer gas of tetramethylsilane and oxygen gas were introduced in the vessel 2 through an inlet 4 at rates of 50 sccm and 12 sccm respectively and plasma polymerized under a gas pressure of 0.024 Torr at a 13.56 MHz radio frequency with power of 150 W supplied to an electrode 5 to form a protective layer of 220 Å in thickness.

In FIG. 3, the same numerals represent the same elements as in FIG. 1.

Figure 4:
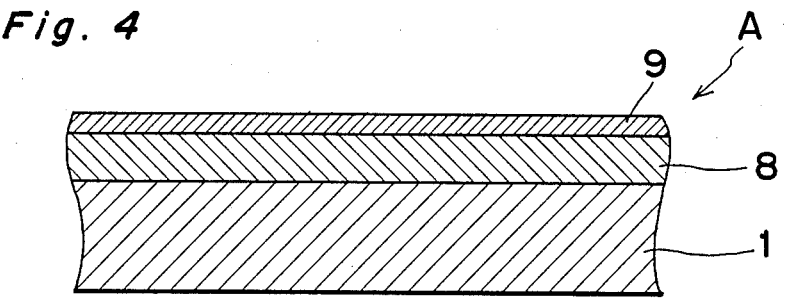
FIG. 4 is an enlarged cross section of still another embodiment of the magnetic recording medium of the invention.

The polyester film was cut into a magnetic recording tape A with the ferromagnetic metal layer 8 and the protective layer 9 as shown in FIG. 4.

The ratio of the component atoms in the protective layer were measured by an Auger electron spectrometer to find that atomic ratio of silicon:carbon:oxygen was 1:2.81:1.11.

EXAMPLE 15

In the same manner as in Example 14 but using vinyltrimethylsilane at the same flow rate in place of tetramethylsilane, a magnetic recording tape A having a protective layer of 230 Å in thickness was produced. Atomic ratio of silicon:carbon:oxygen was 1:3.06:1.07.

EXAMPLE 16

In the same manner as in Example 14 but introducing oxygen gas at a flow rate of 6 sccm and plasma polymerizing the monomer under a pressure of 0.022 Torr, a magnetic recording tape A having a protective layer of 200 Å in thickness was produced. Atomic ratio of silicon:carbon:oxygen was 1:3.42:0.87.

EXAMPLE 17

In the same manner as in Example 14 but introducing oxygen gas at a flow rate of 20 sccm and plasma polymerizing the monomer under a pressure of 0.026 Torr, a magnetic recording tape A having a protective layer of 230 Å in thickness was produced. Atomic ratio of silicon:carbon:oxygen was 1:2.21:1.31.

EXAMPLE 15

In the same manner as in Example 14 but using octamethylcyclotetrasiloxane at a flow rate of 50 sccm in place of tetramethylsilane and plasma polymerizing the the monomer under a pressure of 0.02 Torr, a magnetic recording tape A having a protective layer of 300 Å in thickness was produced. Atomic ratio of silicon:carbon:oxygen was 1:1.75:1.81.

COMPARATIVE EXAMPLE 5

In the same manner as in Example 14 but introducing no oxygen gas and plasma polymerizing the monomer under a pressure of 0.02 Torr, a magnetic recording tape A having a protective layer of 230 Å in thickness was produced.

COMPARATIVE EXAMPLE 6

In the same manner as in Example 15 but introducing no oxygen gas and plasma polymerizing the monomer under a pressure of 0.02 Torr, a magnetic recording tape A having a protective layer of 240 Å in thickness was produced.

The magnetic recording tapes produced in Examples 14–17 and Comparative Examples 4–6 were examined for their durability and running characteristic.

The durability was evaluated by subjecting each tape to the still test by means of a 8 mm type videotape recorder and measuring the period of time of the test till the protective layer was damaged. The running characteristic was evaluated by measuring tension at the winding side during traveling the tape on the 8 mm type videotape recorder. The tension corresponds to the degree of friction between the magnetic recording tape and a drum. The results are shown in Table 2.

TABLE 2

| Example No. | Durability (second) | Tension (g) |
|---|---|---|
| 14 | 980 | 10.7 |
| 15 | 520 | 10.5 |
| 16 | 890 | 10.7 |
| 17 | 600 | 11.0 |
| Comp. 4 | 50 | 15.3 |
| Comp. 5 | 170 | 17.5 |
| Comp. 6 | 100 | 16.1 |

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A magnetic recording medium comprising a substrate, a magnetic layer and a first protective layer which consists of an organic polymeric material comprising carbon atoms, hydrogen atoms and oxygen atoms, the content of the oxygen atom increasing towards the outer surface of the protective layer, the thickness of the protective layer ranging from 20 to 2,000 Å.

2. A magnetic recording medium according to claim 1, wherein the oxygen content within a 20 Å thickness at the surface of said first protective layer is from 5 to 70% by weight of the organic polymer in said thickness.

3. A magnetic recording medium according to claim 2, wherein the oxygen content in the whole first protective layer is from 5 to 50% by weight.

4. A magnetic recording medium comprising a substrate, a magnetic layer, a first protective layer which consists of an organic polymeric material comprising carbon atoms, hydrogen atoms and oxygen atoms, the content of the oxygen atom increasing towards the outer surface of the protective layer, wherein the oxygen content within a 20 Å thickness at the surface of the first protective layer is from 5 to 70% by weight of the organic polymer in said thickness and a second protective layer of a lubricant formed on said first protective layer.

5. A magnetic recording medium according to claim 1, wherein said organic polymeric material constituting the protective layer further comprises silicon atoms.

6. A magnetic recording medium according to claim 1, wherein said organic polymeric material further comprises metal atoms.

7. A magnetic recording medium according to claim 5, having an atomic ratio of oxygen atom to silicon atom in the protective layer of from 0.7:1 to 1.3:1.

8. A magnetic recording medium according to claim 1, which further comprises a second protective layer of a lubricant formed on said first protective layer.

9. A magnetic recording medium according to claim 8, wherein the oxygen content within a 20 Å thickness at the surface of the first protective layer is from 5 to 70% by weight of the organic polymer in said thickness.

10. A magnetic recording medium according to claim 9, wherein the oxygen content in the whole protective layer is from 5 to 50% by weight.

11. A magnetic recording medium according to claim 8, wherein said organic polymeric material further comprises silicon atoms.

12. A magnetic recording medium according to claim 8, wherein said organic polymeric material further comprises metal atoms.

* * * * *